United States Patent [19]

Jacobus

[11] 4,251,942
[45] Feb. 24, 1981

[54] FISHHOOK

[76] Inventor: Daniel A. Jacobus, 250 Orchard La., Sunbury, Ohio 43074

[21] Appl. No.: 68,916

[22] Filed: Aug. 23, 1979

[51] Int. Cl.³ .............................................. A01K 83/06
[52] U.S. Cl. ..................................... 43/44.8; 43/44.82
[58] Field of Search ................... 43/43.16, 44.8, 44.82, 43/44.2, 44.6

[56] References Cited

U.S. PATENT DOCUMENTS

| | | | |
|---|---|---|---|
| 1,820,887 | 8/1931 | Pflueger | 43/44.8 X |
| 2,266,725 | 12/1941 | Andrews | 43/44.8 |
| 2,825,173 | 3/1958 | Gederos | 43/44.2 |
| 2,825,174 | 3/1958 | Leinonen | 43/44.8 |
| 3,333,359 | 8/1967 | Barker | 43/44.8 X |

Primary Examiner—Nicholas P. Godici
Attorney, Agent, or Firm—Robert E. Stebens

[57] ABSTRACT

A double barbed fishhook is provided for advantageous use with live bait. This double barbed fishhook structure is formed from a single piece of metal wire rod having barbs at each end and folded into the desired configuration. The fishhook structure includes an elongated shank, a line attaching post at one end of the shank, a U-shaped hook at the opposite end and a barbed stem intermediate the hook and post. The line attaching post and barbed stem project a predetermined distance from the shank in relationship to the length of the hook and end gap of the U-shaped hook. The U-shaped hook, barbed stem and line attaching post all lie in a same common plane.

13 Claims, 4 Drawing Figures

FISHHOOK

BACKGROUND OF THE INVENTION

This invention is directed to the providing of an improved fishhook which is designed to be advantageously used for live bait fishing. Numerous types and configurations of fishhooks are known for use in connection with live bait fishing. Most of the hooks heretofore available are of the conventional single or multiple simple barb hook design. The problems encountered by fishing with this type of hook are many. First, live bait has a tendency to become dislodged from the hook after several casts. Second, live bait, such as minnows, appears extremely lifeless on a simple barb hook as they are generally hooked at a point such that they will not move through the water in a natural, lifelike appearing manner, and consequently less appetizing to the predator game fish that is being sought. Third, the bait does not substantially hide the hook from the view of the fish. As a consequence, many fishermen use artificial bait which can be securely attached, will not become dislodged as easily, and can appear more animated. However, it is well-known that artificial bait is consistently less successful than live bait.

To combat the problem of losing bait, double prong or barb fishhooks were developed such as those by J. Andrews, U.S. Pat. No. 2,266,725; C. S. Roy, U.S. Pat. No. 2,563,554 and L. Barker, U.S. Pat. No. 3,333,359. Andrews discloses a fishhook having the traditional primary barb at one end of the shank but, additionally, having a small barb formed at a point along the shank in spaced relationship to the primary barb. The hook shank then curves into a reverse bend and terminates in an eye for attachment of a fish line. The vertical plane of the eye is perpendicular to the vertical plane of the shank and is located at about the small barb relative to the length of the shank, but is substantial laterally spaced relationship thereto. As a consequence, this hook configuration tends to be unstable, resulting in erratic and unnatural movement of the bait as it is pulled through the water. Roy discloses a continuous piece of metal with a double hook feature, but the two barbs are at right angles to one another. Barker, in FIG. 1, discloses a fishhook with a traditional primary barb at one end and a second small barb in spaced relationship to the primary barb. However, the eye is in the same horizontal plane as the shank and results in instability and erratic movement of the bait as the hook is pulled through the water.

Although all three of the noted previously patented hooks have dual barbed hooks, each hook has characteristic disadvantages and fails to meet desired performance standards. First, the bait undergoes a great deal of stress in Roy, U.S. Pat. No. 2,563,554, and Barker U.S. Pat. No. 3,333,359, and, because of the angle at which the bait is secured with respect to its direction of movement through the water, it can easily become disabled or dislodged. In Andrews, U.S. Pat. No. 2,266,725, while the bait can be secured fairly well, the hook spins about the eyelet while in the water. The problem of the spin and resultant erratic movement of the bait was neglected in Barker, Roy and Andrews so the bait did not appear lifelike when it was pulled through the water.

SUMMARY OF THE INVENTION

In accordance with this invention, a double barb fishhook is provided for advantageous use in fishing, especially with live bait. The hook of this invention is readily formed from a single metal wire rod, thereby facilitating fabrication resulting in economy of manufacture. The hook is formed having two barbs which aid in securing the bait and is of a configuration and structure such that the bait better camouflages the hook and to also cause the bait to appear more lifelike as it is pulled through the water. The invention has a barbed hook at one end of the wire, a shank portion which extends the entire length of the hook, a stem and eyelet projecting laterally from the shank for attaching the line to the hook and a second barb which projects laterally from the shank. The elongated wire rod from which the hook is formed with a barb at each end is then bent into the desired configuration.

The primary objective of this invention is to provide a fishook which causes the bait to appear more lifelike. Important aspects of this objective are the two barbs and the relative position of the eyelet with respect to the shaft.

Another objective of this invention is to provide for the secure attachment of live bait to a fishhook and enhance its retention for numerous successive casts.

An additional objective of this invention is to better camouflage the hook by use of the bait.

Still another objective of this invention is to save time and money in fishing by decreasing the amount of bait lost and to increase the number of successive casts with the same bait which reduces the time otherwise required to rebait the hook, thereby increasing fishing enjoyment.

Yet another objective of this invention is to combine the advantage of live bait fishing with the speed and convenience of artificial lures.

These and other objects and advantages of this invention will be readily apparent from the foregoing detailed description of an illustrative embodiment thereof. Reference will be had to the accompanying drawings which illustrate an embodiment of the invention.

DESCRIPTION OF THE DRAWING FIGURES

DESCRIPTION OF THE ILLUSTRATIVE EMBODIMENT

Figure 1:
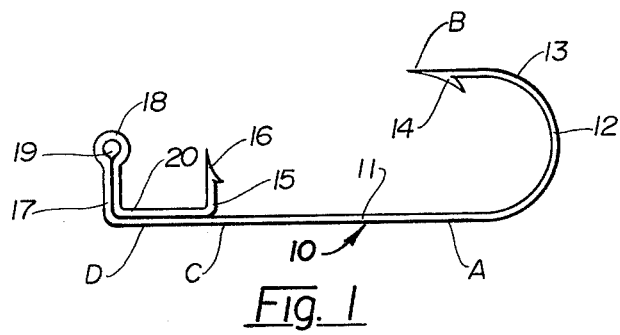
FIG. 1 is a side elevational view of double barb fishhook embodying this invention.
Figure 2:
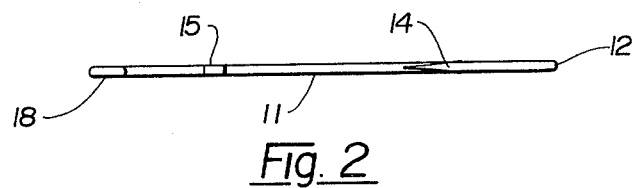
FIG. 2 is a top view of the fishhook as seen in FIG. 1.

Having reference to the drawings, attention is directed to FIGS. 1 and 2 which illustrate a double barbed fishhook structure embodying this invention and designated generally numeral 10. The double barbed fishhook structure of this invention includes an elongated shank 11 which, at one end, curves in a reverse direction to form a U-shaped hook 12. This specific hook 12 configuration has a leg portion 13 disposed in a substantially parallel relationship to the shank 11. At the terminal end of the leg portion is a large barb 14 which serves to catch the game fish that is sought. While a parallel leg portion and shank relationship is shown, it will be understood that the hook 12 may be of a configuration other than strictly U-shaped.

Formed at the opposite end of the shank 11 is a barbed stem 15, provided at its outer end with a small barb 16, and a line attaching post 17. The line attaching post 17 has an eye loop or eyelet 18 defining an aperture 19 for the attachment of a fish line (not shown). It will be noted that both the barbed stem 15 and the post 17 project laterally from the shank in the same direction and lie in a same plane as is defined by the U-shaped hook with the barbed stem being located at a point along the shank intermediate the post and the U-shaped hook. Also, the eyelet 18 is formed to lie in that same plane. In forming the hook from a single piece of wire rod, it will be seen that the rod is doubled in forming the line attaching post 17 and includes a straight section 20 interconnecting with the barbed stem and extending in parallel adjacent relationship with the shank 11. Positioning the eyelet in the same plane as the two barbs and in laterally spaced relationship to the shank provides distinct advantages over other fishhook configurations. By positioning the eyelet in this way, the fishhook resists the tendency to twirl or oscillate about the shank. Additionally, this positioning and arrangement of components allows the fishhook to be pulled through the water in a manner such that the bait moves in a substantially axial direction which appears far more lifelike, especially for minnows since it then appears that the bait is swimming rather than just drifting lifelessly through the water or moving in an erratic or unrealistic manner.

Figure 4:
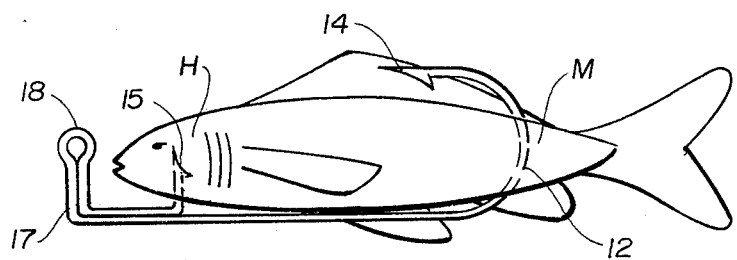
FIG. 4 is a side elevational view of the hook of this invention with the bait secured thereto.

Having the two barbs located in the vertical plane also permits more secure attachment of the bait to the fishhook as can be readily seen in FIG. 4. For example, using live minnows M as bait, the large barb 14 is inserted through the underside of the minnow near its midpoint to through the minnow and results in securing the minnow on the U-shaped hook 12. With the minnow thus secured on the U-shaped hook 12, it is then easily manipulated to a position where it is longitudinally aligned with the shank and projecting in a direction with the head extending toward the barbed stem 15 and line attaching post 17. Assuming that a proper sized minnow has been selected for this specific size hook 10, the head H of the minnow is then pushed down upon the barbed stem 15 to secure the bait as is shown in FIG. 4. The bait then also serves to substantially camouflage the majority of the fishhook from the view as all exposed components lie in close proximity to the bait minnow M. By incorporating the barbed stem 15 into the fishhook, a substantial amount of time can be saved by increasing the number of successive casts that can be made with the same bait. Therefore, this invention permits the enjoyment of live bait fishing, yet with the convenience and speed usually associated only with artificial lures.

Location of the eyelet 18, as illustrated to be essentially aligned with the longitudinal axis of the bait minnow M, results in the minnow moving relatively smoothly and without extreme oscillation or rubbing about the longitudinal axis and in a more realistic manner. Also, since a greater proportion of the hook lies below the point at which a pulling force is applied, the hook will remain in the illustrated upright position and thus maintain the minnow upright.

The total length of an illustrative embodiment of the invention is about three (3) inches while the width of the U-shaped hook is approximately one (1) inch. The heights of the barbed stem 15 and the line attaching post 17 are approximately equal. Also, their height is in the range of 50-60% of the distance between A and B which represents the end gap width of the U-shaped hook. Additionally, the barbed stem 15 is located along the shank 11 at C which is located approximately one-third ($\frac{1}{3}$) of the distance from point D at the line attaching post 17 to point A at the open end of the U-shaped hook with the distance D-A being of the order of two (2) inches.

Figure 3:
FIG. 3 is a plan view of an elongated wire rod used to construct an embodiment of this invention, but having the barbs formed at each end thereof.

Fabrication of this hook is relatively simple and economical. A predetermined length of wire rod R is selected as shown in FIG. 3 and the respective barbs 14 and 16 are formed at opposite ends. The rod R can then be readily bent into the illustrated configuration and subjected to heat treating process deemed appropriate.

It will be readily apparent from the foregoing detailed description of illustrative embodiments of this invention that a particularly novel and extremely effective double barbed fishhook is provided. This style of fishhook is relatively simple to fabricate since it requires only a double barbed piece of wire. The specific planar relationship between the eyelet, the barbed stem, and the large barb result in a more efficient hook that causes the bait to appear more realistic in addition to providing for a secure attachment of the bait to the fishhook.

Having thus described this invention, what is claimed is:

1. A fishhook comprising
    an elongated shank having a generally U-shaped hook formed at a first end thereof with a leg of the hook extending toward a second end of said shank in predetermined spaced relationship to said shank, said leg terminating in a retaining barb,
    fish line attaching means formed with said shank at the second end thereof and including a post projecting a distance laterally from said shank at the side thereof to lie in a plane defined by said U-shaped hook, said post having means for securing of a fish line thereto at a point in predetermined spaced relationship to said shank, and
    a barbed stem formed with said shank at a point intermediate said U-shaped hook and said line attaching means in predetermined spaced relationship to each end thereof, said barbed stem projecting a predetermined distance laterally from said shank and lying in the aforesaid plane, said fish line attaching means and U-shaped hook disposed at opposite sides of a plane disposed transversely to said elongated shank and passing through said barbed stem.

2. A fishhook according to claim 1 wherein the leg of said U-shaped hook is disposed parallel to said shank.

3. A fishhook according to claim 1 wherein said line attaching means post has an eye loop formed at an outer end thereof for securing of a fish line thereto, said eye loop defining a plane and oriented to lie in the plane defined by said U-shaped hook.

4. A fishhook according to claim 1 wherein said line securing means is at a point spaced a distance from said shank not greater than the spacing of said hook leg from said shank.

5. A fishhook according to claim 1 wherein the leg of said U-shaped hook is spaced from said shank to define an entrance gap of predetermined width and said fish line attaching means is disposed a distance from the open end of said U-shaped hook that is of the order of twice the gap width.

6. A fishhook according to claim 5 wherein said barbed stem is disposed at a point spaced from said line attaching means a distance which is of the order of one-third of the spacing of said line attaching means and the entrance gap of said U-shaped hook.

7. A fishhook according to claim 5 wherein said line attaching means is adapted to secure the fish line thereto at a point spaced a distance laterally from said shank of the order of one-half of the gap width.

8. A fishhook according to claim 5 wherein said line attaching means is adapted to secure the fish line thereto at a point spaced a distance laterally from said shank of the order of 60% of the gap width.

9. A fishhook according to claim 4 wherein said barbed stem projects from said shank a distance of the order of one-half of the gap width.

10. A fishhook according to claim 4 wherein said barbed stem projects from said shank a distance of the order of 60% of the gap width.

11. A fishhook according to claims 9 or 10 wherein said barbed stem is disposed at a point spaced from said line attaching means a distance which is of the order of one-third of the distance between said line attaching means and the entrance gap of said U-shaped hook.

12. A fishhook according to claim 1 and which is formed from a single elongated wire rod.

13. A fishhook according to claim 12 wherein one end portion of said wire is reverse folded upon itself to form said U-shaped hook and the other end portion is folded to form said laterally projecting line attaching means and extend in a reverse direction along said shank to a point where a terminal end portion is projected laterally outward to form said barbed stem.

* * * * *